US012615471B2

(12) United States Patent
Lin

(10) Patent No.: US 12,615,471 B2
(45) Date of Patent: Apr. 28, 2026

(54) HEADPHONE

(71) Applicant: CHENG UEI PRECISION INDUSTRY CO., LTD., New Taipei City (TW)

(72) Inventor: Chin-Chung Lin, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 239 days.

(21) Appl. No.: 18/651,661

(22) Filed: Apr. 30, 2024

(65) Prior Publication Data

US 2025/0126391 A1 Apr. 17, 2025

(30) Foreign Application Priority Data

Oct. 12, 2023 (CN) ......................... 202322731857.8

(51) Int. Cl.

*H04R 1/10* (2006.01)
*H01H 13/10* (2006.01)
*H01H 13/81* (2006.01)
*H04R 1/02* (2006.01)

(52) U.S. Cl.

CPC ........... *H04R 1/1041* (2013.01); *H01H 13/10* (2013.01); *H01H 13/81* (2013.01); *H04R 1/02* (2013.01); *H04R 1/1008* (2013.01)

(58) Field of Classification Search

CPC ...... H04R 1/1041; H04R 1/02; H04R 1/1008; H04R 1/1066; H04R 5/033; H01H 13/10; H01H 13/81

See application file for complete search history.

(56) References Cited

U.S. PATENT DOCUMENTS 11,747,011 B2 * 9/2023 Tseng .................. H04R 1/1058
362/86

* cited by examiner

*Primary Examiner* — Tuan D Nguyen
(74) *Attorney, Agent, or Firm* — Cheng-Ju Chiang

(57) ABSTRACT

A headphone includes an outer housing, a light guiding unit, two push buttons, a circuit board mounted in the outer housing, two switches mounted at the circuit board, and an inner housing covered to the outer housing. The outer housing has a peripheral wall, a button hole and an outer wall. An inner surface of the peripheral wall is defined as an inner periphery surface. An outer surface of the peripheral wall is defined as an outer periphery surface. The button hole penetrates through the inner periphery surface and the outer periphery surface. The outer wall is connected with the peripheral wall. An inner surface of the outer wall is defined as an interior surface. The light guiding unit is mounted in the outer housing, and the light guiding unit partially penetrates through the button hole. The two switches resist against the two push buttons.

13 Claims, 18 Drawing Sheets

HEADPHONE

CROSS REFERENCE TO RELATED APPLICATIONS

The present application is based on, and claims priority from, China Patent Application No. 202322731857.8, filed Oct. 12, 2023, the disclosure of which is hereby incorporated by reference herein in its entirety.

BACKGROUND OF THE INVENTION

Field of the Invention

The present invention generally relates to a headphone, and more particularly to a headphone increasing a using lifespan.

Description of Related Art

A current headphone includes two earphone units, and a headband connected between the two earphone units. An inside of each earphone unit is equipped with a circuit board. A surface of each earphone unit has a push button. The push button contacts with a switch arranged on the circuit board. When the push button is pressed down, the push button triggers the switch to make the current headphone perform a corresponding action. When the push button is released, the push button returns to its original position by an elastic force of the switch.

However, in a using process of the headphone, the push button needs pressing several times to perform actions, such as a volume adjustment action, a fast forward action, a song selection action, a power-on action, a power-off action, etc. After the push button contacts with the switch repeatedly, a failure of the switch may be caused. As a result, a lifespan of headphone is shortened.

Therefore, in view of the above-mentioned shortcomings, it is necessary to provide a headphone increasing a using lifespan.

BRIEF SUMMARY OF THE INVENTION

An object of the present invention is to provide a headphone increasing a using lifespan. The headphone includes an outer housing, a light guiding unit, two push buttons, a circuit board, two switches and an inner housing. The outer housing has a peripheral wall, a button hole and an outer wall. An inner surface of the peripheral wall is defined as an inner periphery surface. An outer surface of the peripheral wall is defined as an outer periphery surface. The button hole penetrates through the inner periphery surface and the outer periphery surface. The outer wall is connected with an outer periphery of the peripheral wall. An inner surface of the outer wall is defined as an interior surface. An outer surface of the outer wall is defined as an external surface. The inner periphery surface is connected with a periphery of the interior surface. The interior surface protrudes inward to form a protruding platform. The protruding platform is positioned between the interior surface and the inner periphery surface. The light guiding unit is mounted in the outer housing, and the light guiding unit partially penetrates through the button hole. Each push button includes a button body mounted in the outer housing, a button cap, a pressing portion and a retaining portion. The button cap is mounted to an outer end of the button body. The button cap penetrates through the button hole of the outer housing. The two button caps of the two push buttons are located to the button hole of the outer housing by the light guiding unit. The two button caps of the two push buttons are located to an upper surface and a lower surface of the light guiding unit. The pressing portion is extended inward from an inner surface of the button body. The retaining portion is extended inward and then is extended towards the interior surface from an inner end of the button body. The pressing portion is spaced from the retaining portion. An outer surface of the retaining portion abuts against the protruding platform. The circuit board is mounted in the outer housing. An inner surface of the retaining portion abuts against the circuit board. The retaining portion is clamped between the circuit board and the protruding platform. The two switches are mounted at the circuit board. The two switches resist against the two pressing portions of the two push buttons. The inner housing is covered to the peripheral wall of the outer housing.

Another object of the present invention is to provide a headphone. The headphone includes a housing, a light guiding unit, two push buttons and a circuit board. The housing has a button hole penetrating through a sidewall of the housing. An inner surface of the housing protrudes inward to form a protruding platform. The light guiding unit is mounted in the housing, and the light guiding unit partially penetrates through the button hole. The light guiding unit has a guiding board. The two push buttons are mounted in the housing. The two push buttons penetrate through the button hole. The two push buttons are located to the button hole by the light guiding unit. The light guiding unit is located between the two push buttons. Each push button includes a button body, and a retaining portion extended inward and then extended towards the inner surface of the housing from an inner end of the button body. The circuit board is mounted in the housing. The retaining portion is clamped between the circuit board and the protruding platform. The circuit board is equipped with two switches. The two switches resist against the two push buttons. An edge of the circuit board is recessed inward to form an opening slot. The opening slot is formed between the two switches. The guiding board of the light guiding unit is disposed in the opening slot.

Another object of the present invention is to provide a headphone. The headphone includes an outer housing, an inner housing, a button module and a circuit board. The outer housing and the inner housing are assembled to form a housing. An inside of the housing defines an accommodating space. The accommodating space is formed between the outer housing and the inner housing. The housing has a button hole penetrating through a sidewall of the housing. An inner surface of the housing protrudes inward to form a protruding platform. The button module is accommodated in the accommodating space. The button module includes a light guiding unit and two push buttons. The light guiding unit has a guiding body. An outer portion of the guiding body protrudes towards the inner surface of the housing to form a guiding board. The guiding body passes through a middle of the button hole, and the guiding body is partially exposed to an outer periphery surface of the outer housing. The two push buttons penetrate through the button hole. The light guiding unit is located between the two push buttons. Each push button includes a button body. The button body has a base board, and a retaining portion extended inward and then extended towards the inner surface of the housing from an inner end of the button body. Two facing surfaces of the two base boards of the two push buttons abut against an upper surface and a lower surface of the guiding body. The circuit board is accommodated in the accommodating space. The retaining portion is clamped between the circuit board and the protruding platform. The circuit board is equipped with two switches. The two switches resist against the two push buttons. An edge of the circuit board is recessed inward to form an opening slot. The opening slot is formed between the two switches. The guiding board of the light guiding unit is disposed in the opening slot.

As described above, the headphone guides the two push buttons to the button hole by the light guiding unit, and the headphone positions the two push buttons to the button hole by the light guiding unit. Furthermore, the two retaining portions of the two push buttons are clamped between the protruding platform and the circuit board, so that the two push buttons move stably under repeatedly pressing the two push buttons, so an abrasion of the circuit board caused by the two push buttons is reduced. As a result, the headphone increases the using lifespan.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
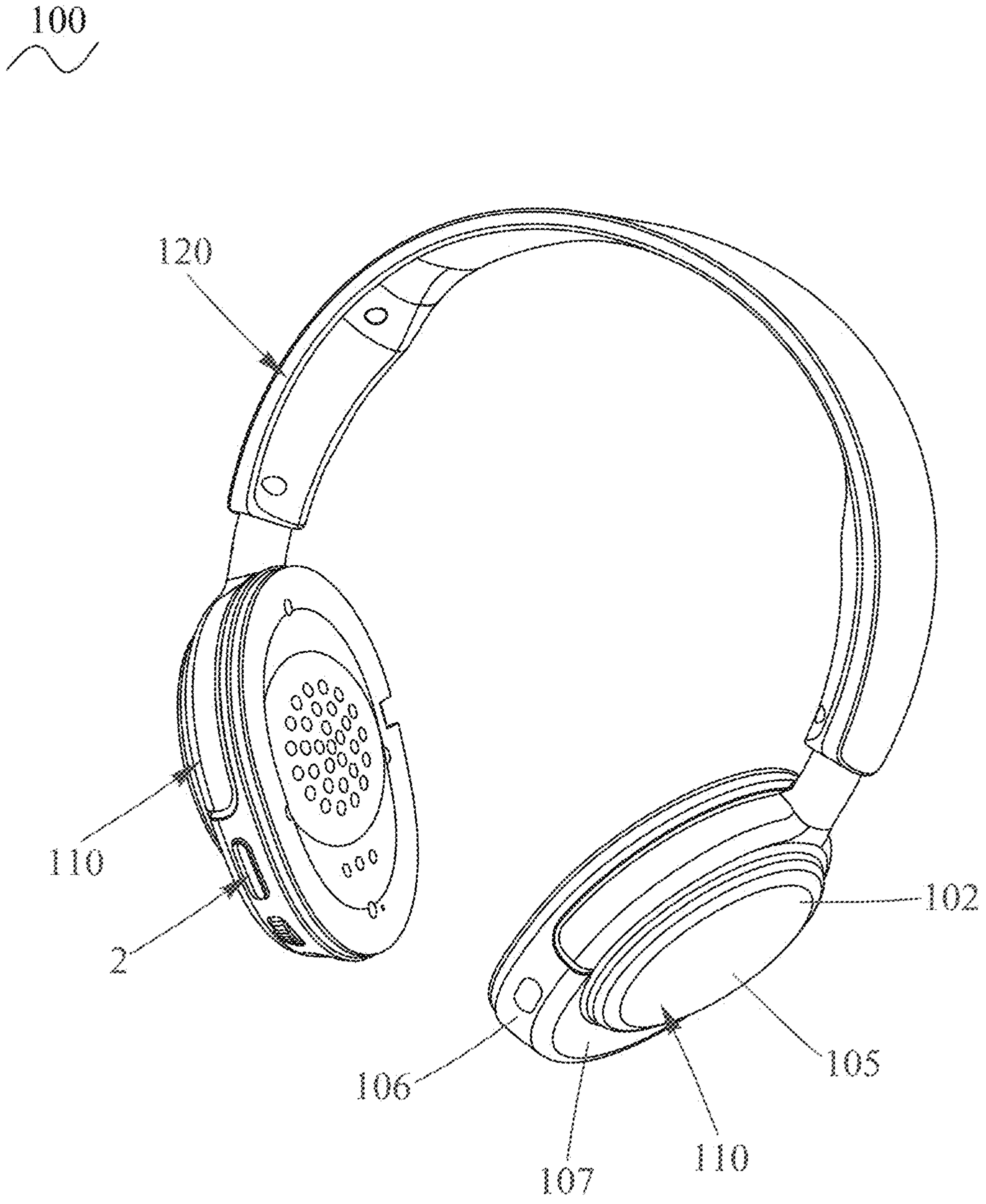
FIG. 1 is a perspective view of a headphone according to the present invention.
Figure 2:
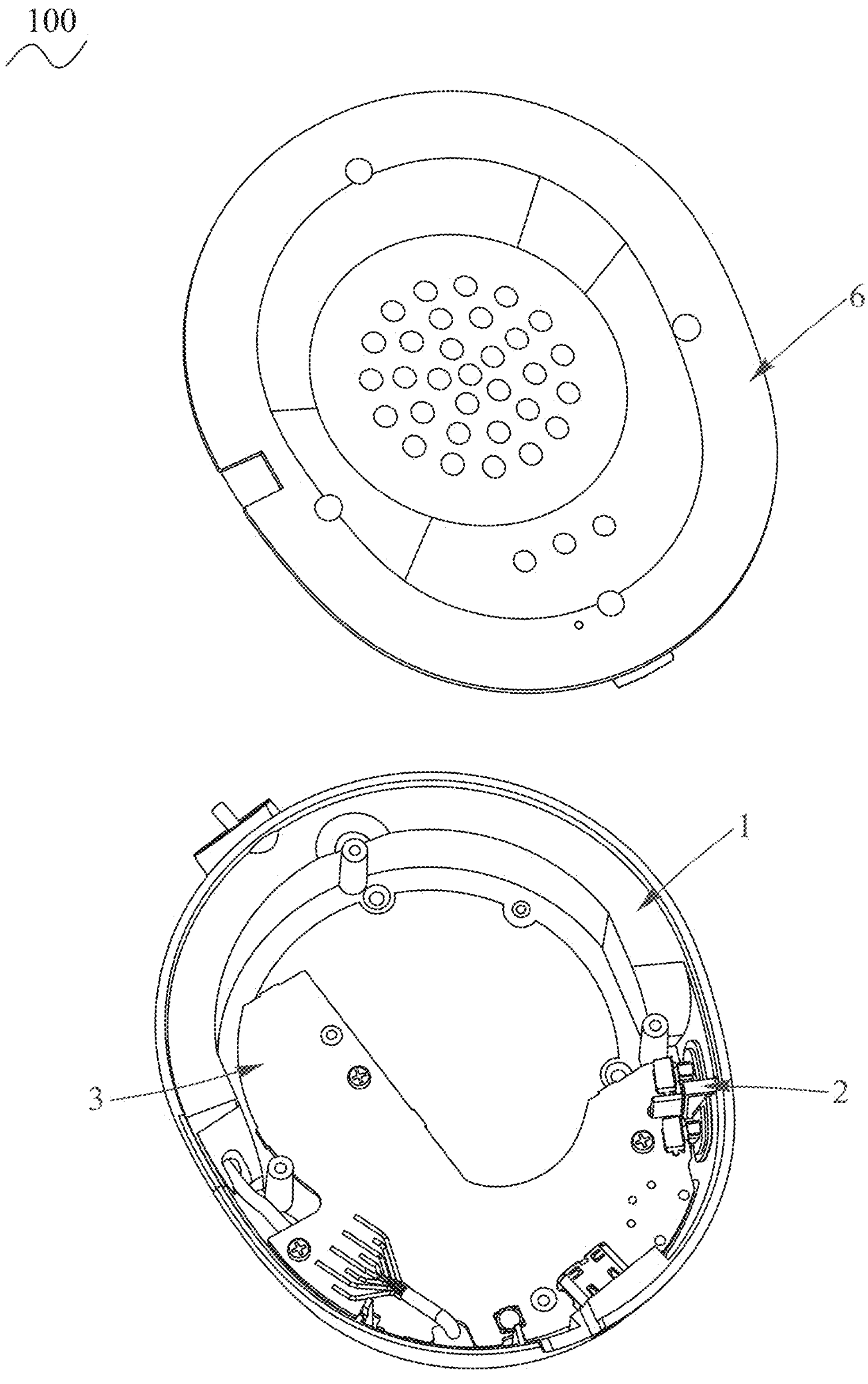
FIG. 2 is a partially exploded view of an earphone unit of the headphone of FIG. 1.
Figure 3:
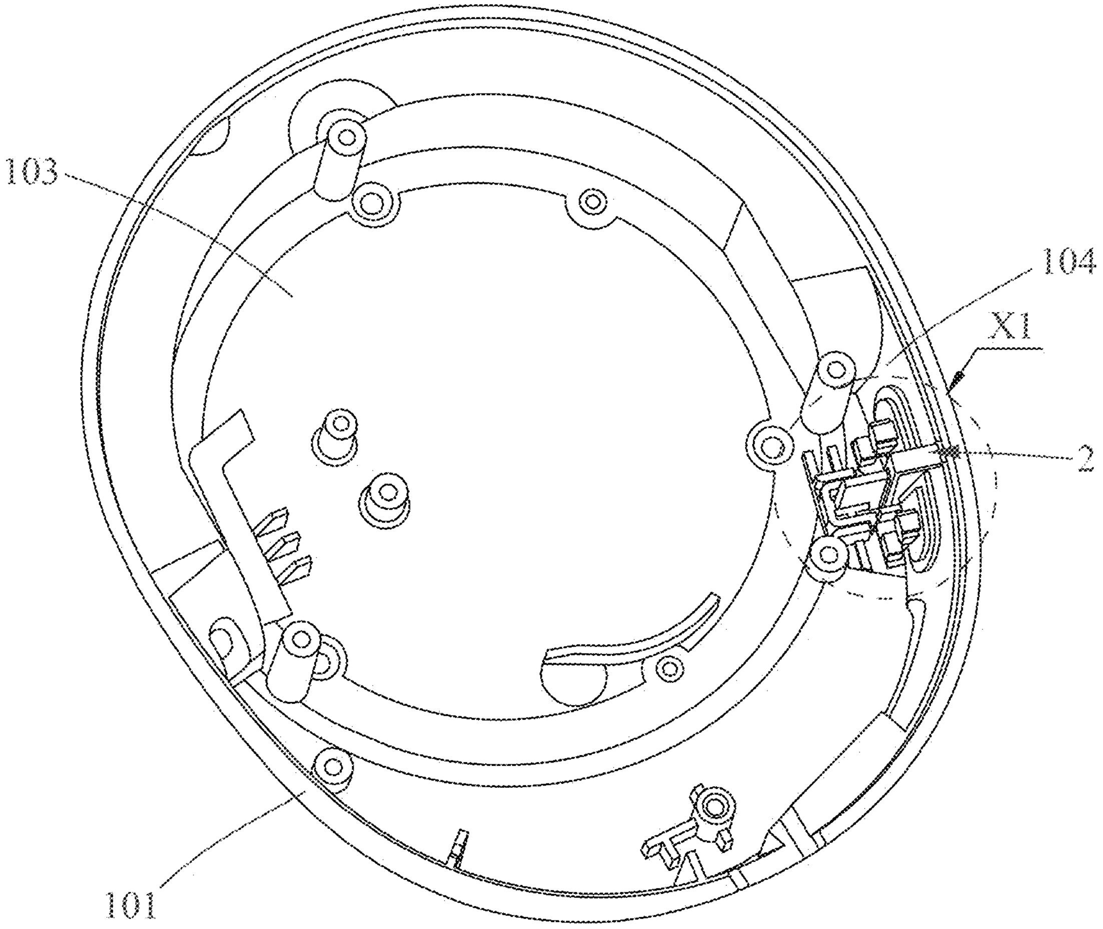
FIG. 3 is a partially perspective view of the earphone unit of the headphone of FIG. 2.
Figure 4:
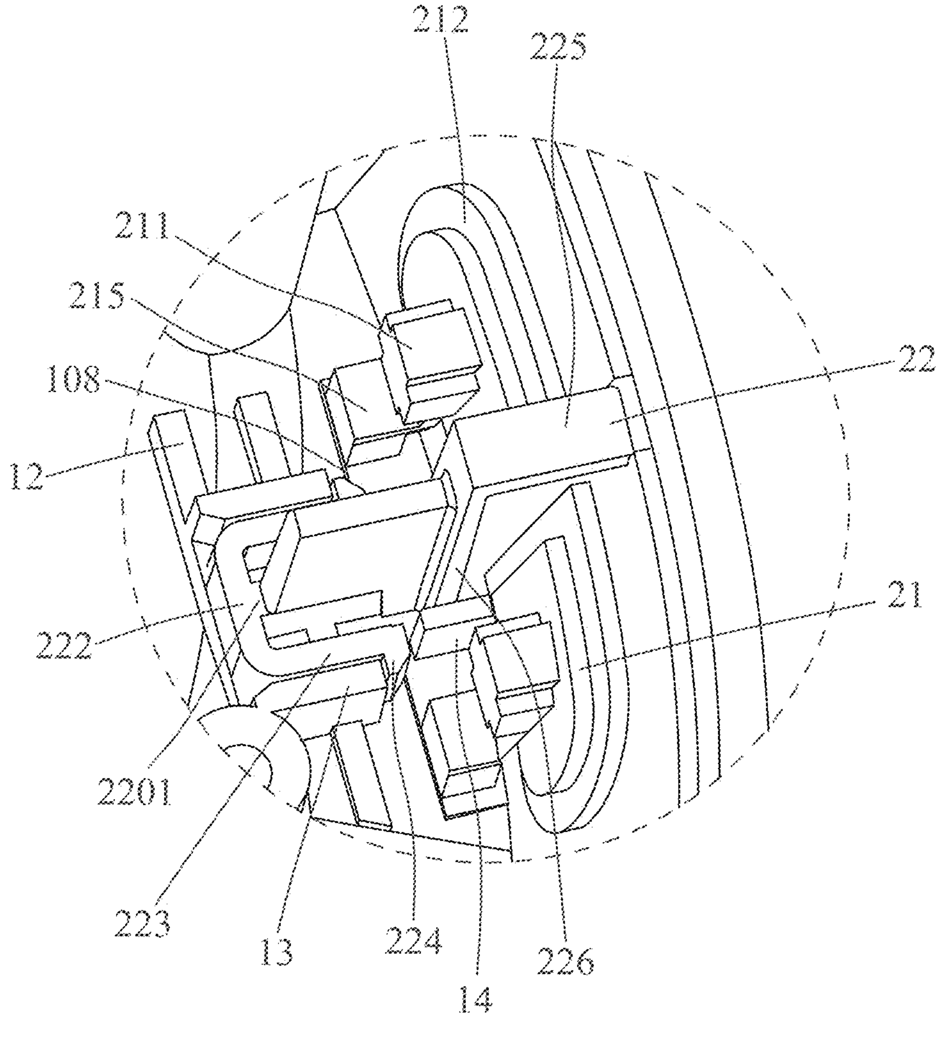
FIG. 4 is an enlarged view of an encircled portion X1 of the headphone of FIG. 3.

Referring to FIG. 1 to FIG. 7, a headphone 100 according to the present invention is shown. The headphone 100 includes two earphone units 110, and a headband 120 connected between the two earphone units 110. Each earphone unit 110 includes an outer housing 1, a button module 2, a circuit board 3, a bracket 4, a cavity holder 5 and an inner housing 6.

The outer housing 1 and the inner housing 6 are assembled to form a housing 107. An inside of the outer housing 1 is hollow. An inside of the housing 107 defines an accommodating space 10. The accommodating space 10 is formed between the outer housing 1 and the inner housing 6. The button module 2, the circuit board 3 and the cavity holder 5 are accommodated in the accommodating space 10. The bracket 4 is attached to an upper portion of the housing 107. The bracket 4 is connected to the upper portion of the housing 107. The button module 2 is mounted in the accommodating space 10 of the housing 107, and the button module 2 partially protrudes outside from one side of the outer housing 1. The circuit board 3 is mounted in the outer housing 1 of the housing 107. The circuit board 3 is positioned in the accommodating space 10. The bracket 4 is arranged on top of the outer housing 1. The cavity holder 5 is positioned in the accommodating space 10. The inner housing 6 is assembled with the outer housing 1 to enclose the accommodating space 10. The headphone 100 sequentially includes the outer housing 1, the bracket 4, the button module 2, the circuit board 3, the cavity holder 5 and the inner housing 6 from an outside to an inside. The bracket 4, the button module 2, the circuit board 3 and the cavity holder 5 are accommodated in the accommodating space 10.

Referring to FIG. 2 to FIG. 12, the outer housing 1 and the inner housing 6 together surround the accommodating space 10. The outer housing 1 has a button hole 11, a reinforcing rib 12, two first retaining walls 13, two second retaining walls 14, a first notch 15, a second notch 16, a peripheral wall 101, an outer wall 102, an interior surface 103, an inner periphery surface 104, an external surface 105 and an outer periphery surface 106. The peripheral wall 101 is formed in a circular shape. The outer wall 102 is connected with an outer periphery of the peripheral wall 101, so that the inside of the outer housing 1 forms an outer portion of the accommodating space 10, and the outer portion of the accommodating space 10 forms an opening 17 penetrating through an inner side of the outer housing 1. The opening 17 is communicated between the inside of the outer housing 1 and an outside. The button module 2, the circuit board 3 and the cavity holder 5 are assembled in the accommodating space 10 through the opening 17. An inner surface of the outer wall 102 is defined as the interior surface 103. An outer surface of the outer wall 102 is defined as the external surface 105. An inner surface of the peripheral wall 101 is defined as the inner periphery surface 104. An outer surface of the peripheral wall 101 is defined as the outer periphery surface 106. The bracket 4 is arranged on top of the outer wall 102, and the bracket 4 is attached to the outer periphery surface 106. The inner periphery surface 104 is connected with a periphery of the interior surface 103. The inner housing 6 is covered to the peripheral wall 101 of the outer housing 1. The housing 107 has the button hole 11 penetrating through a sidewall of the housing 107.

The button hole 11 penetrates through the inner periphery surface 104 and the outer periphery surface 106. In the present invention, the button hole 11 is an elliptical hole penetrating through the peripheral wall 101. In a concrete implementation, a shape of the button hole 11 should be without being limited, the button hole 11 is able to be any shapes. The button module 2 is assembled in the button hole 11. The reinforcing rib 12 is extended from the interior surface 103. The outer housing 1 has two reinforcing ribs 12. The two reinforcing ribs 12 are extended inward from one side of the interior surface 103. The two reinforcing ribs 12 extend along an up-down direction. The two first retaining walls 13 are extended from the one side of the interior surface 103, and the two first retaining walls 13 cross the two reinforcing ribs 12. The two first retaining walls 13 extend in a direction which is the same as an assembling direction of the button module 2. The two first retaining walls 13 are perpendicular to the two reinforcing ribs 12. Two inner surfaces of the two first retaining walls 13 abut against the circuit board 3. An inner corresponding structure of the button module 2 is positioned between the two first retaining walls 13. In the present invention, the interior surface 103 is provided with the two reinforcing ribs 12, and the two first retaining walls 13 are extended between the two reinforcing ribs 12. The two reinforcing ribs 12 and the two first retaining walls 13 are adjacent to the button hole 11.

Two portions of the inner periphery surface 104 extend inward to form the two second retaining walls 14. A middle corresponding structure of the button module 2 is placed between the two second retaining walls 14. The two second retaining walls 14 are placed between the button hole 11 and the interior surface 103. The two second retaining walls 14 abut against the circuit board 3. An inner surface of the housing 107 protrudes inward to form a protruding platform 108. The interior surface 103 protrudes inward to form the protruding platform 108. The protruding platform 108 is positioned between the interior surface 103 and the inner periphery surface 104. The protruding platform 108 is positioned among the interior surface 103, the two second retaining walls 14 and the inner periphery surface 104. The protruding platform 108 is positioned corresponding to the button hole 11. The protruding platform 108 is formed adjacent to the button hole 11. The protruding platform 108 is disposed adjacent to inner sides of the two reinforcing ribs 12 and the two first retaining walls 13. The inner periphery surface 104 is recessed opposite to the circuit board 3 to form the first notch 15. The first notch 15 is connected to a middle of an inner side of the button hole 11. The first notch 15 is communicated with the middle of the inner side of the button hole 11. A section of an outer corresponding structure of the button module 2 which is disposed away from the interior surface 103 is disposed in the first notch 15. The inner periphery surface 104 of the outer housing 1 is recessed opposite to the circuit board 3 to form the second notch 16. The second notch 16 is formed between the two second retaining walls 14. The second notch 16 is connected to a middle of an outer side of the button hole 11. The second notch 16 is communicated with the middle of the outer side of the button hole 11. The other section of the outer corresponding structure of the button module 2 which is disposed next to the interior surface 103 is located in the second notch 16. The first notch 15 and the second notch 16 are located at the inner side and the outer side of the button hole 11 which are opposite to each other.

Figure 5:
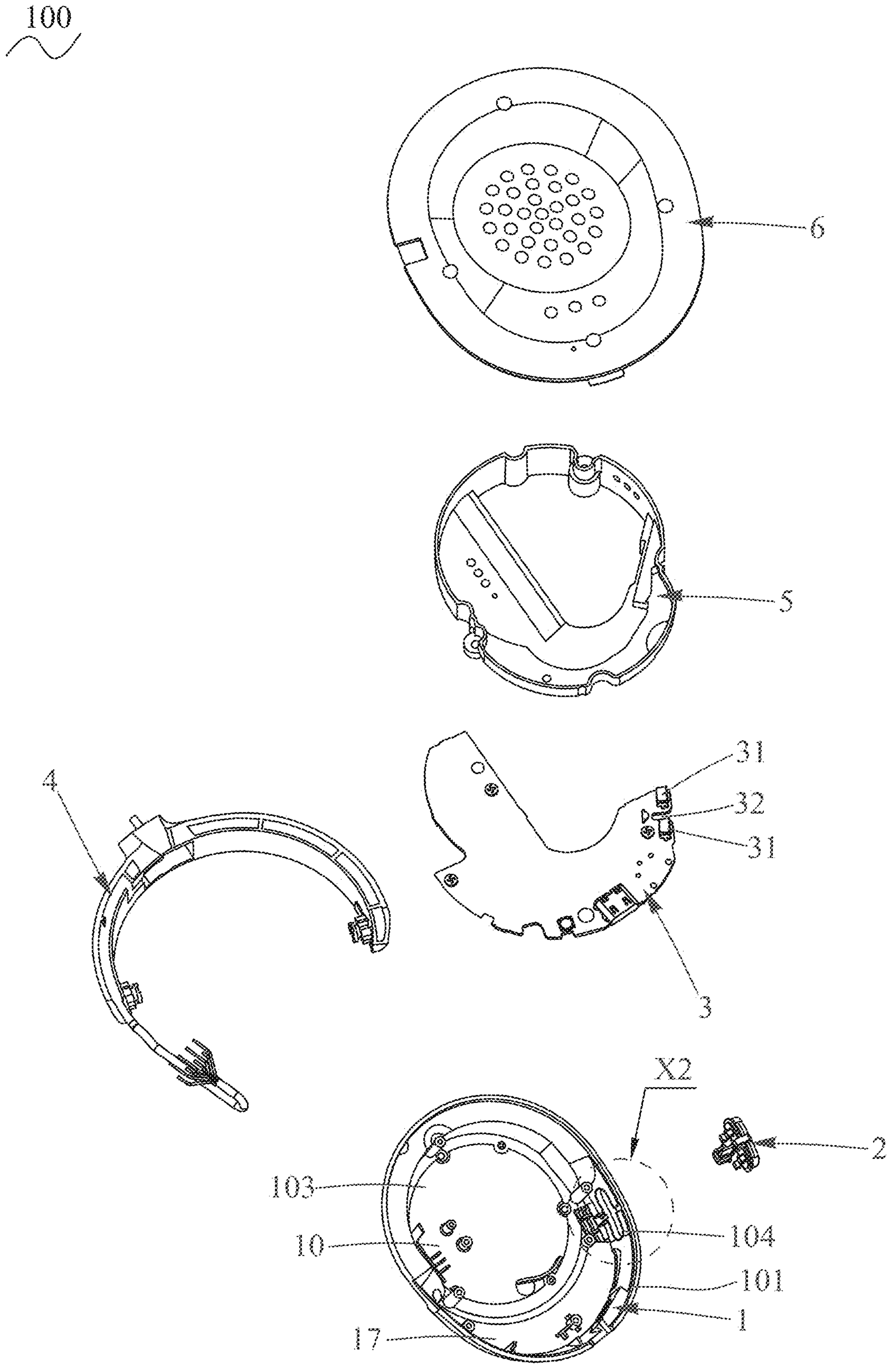
FIG. 5 is an exploded view of the earphone unit of the headphone of FIG. 2.
Figure 6:
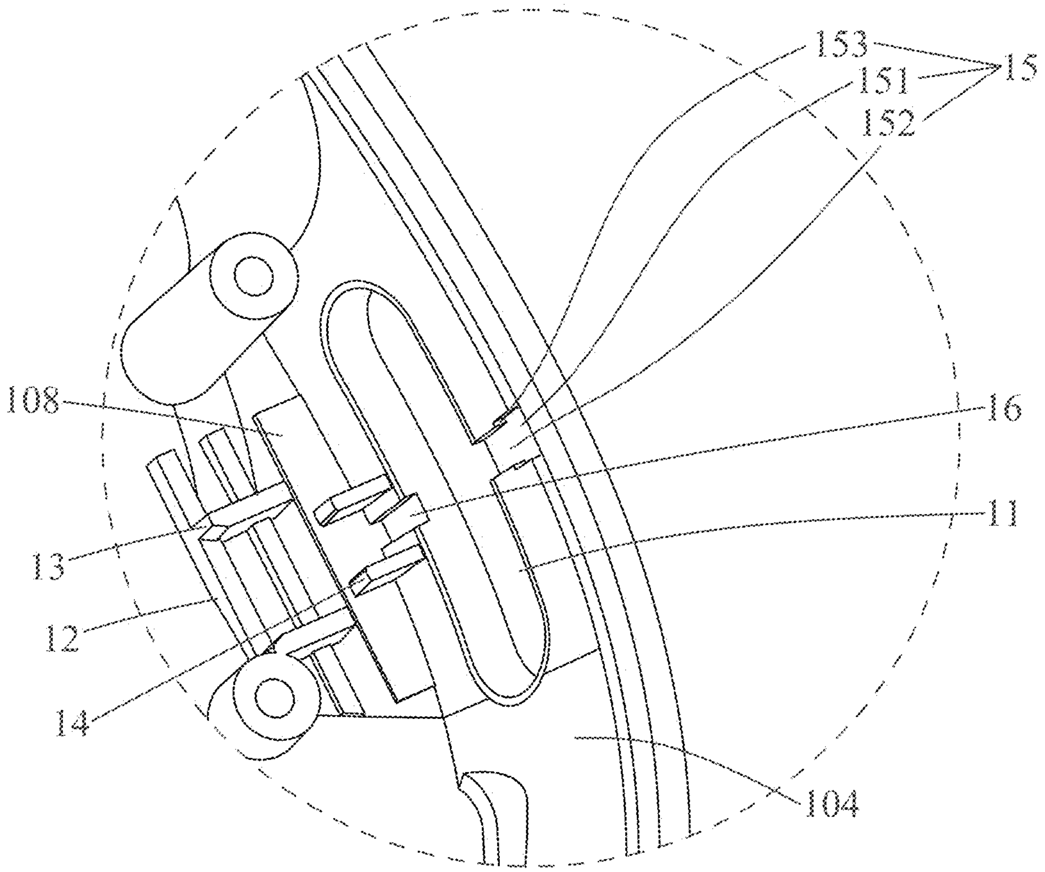
FIG. 6 is an enlarged view of an encircled portion X2 of the headphone of FIG. 5.
Figure 7:
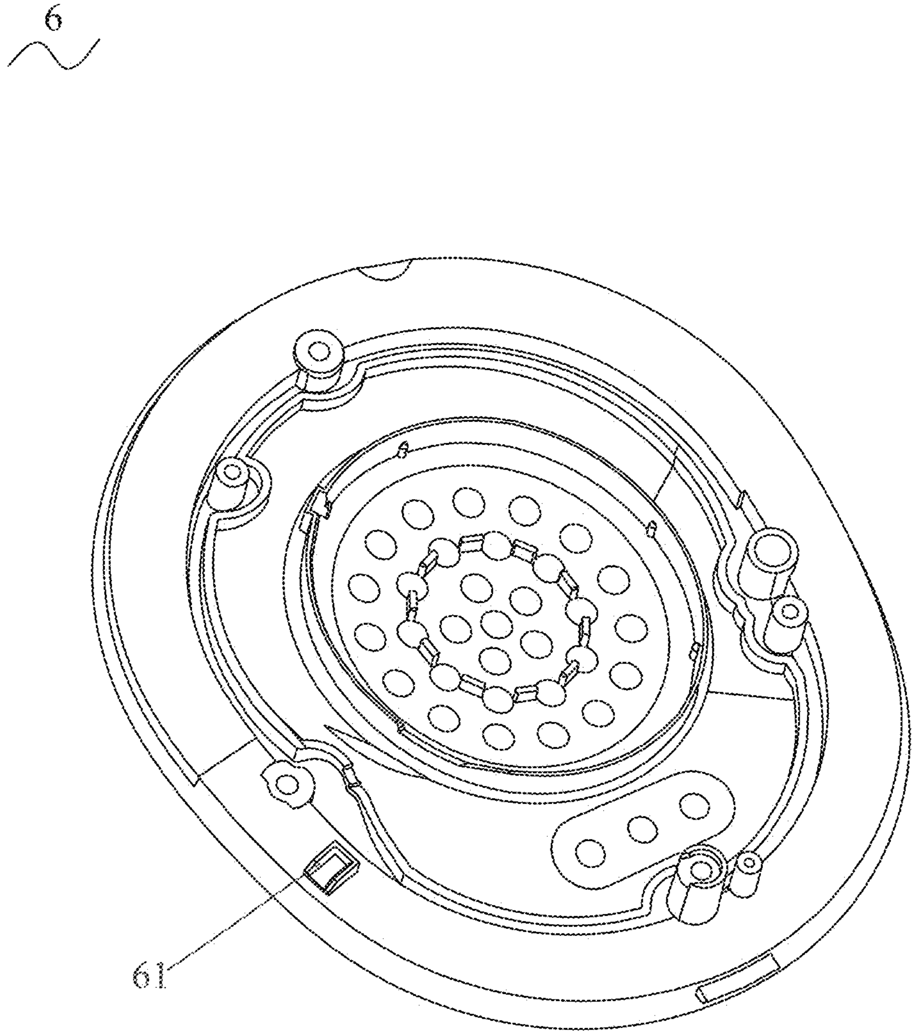
FIG. 7 is a perspective view of an inner housing of the earphone unit of the headphone of FIG. 2.
Figure 8:
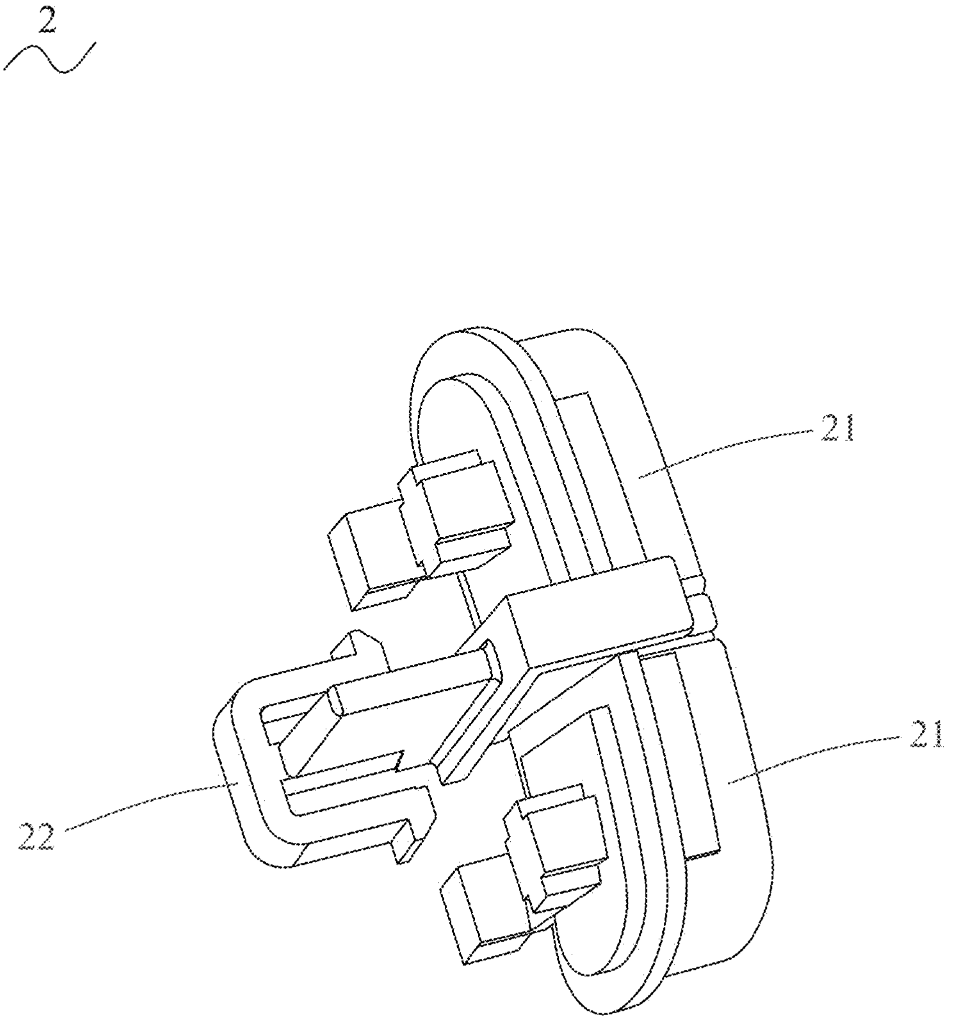
FIG. 8 is a perspective view of a button module of the headphone of FIG. 1.
Figure 9:
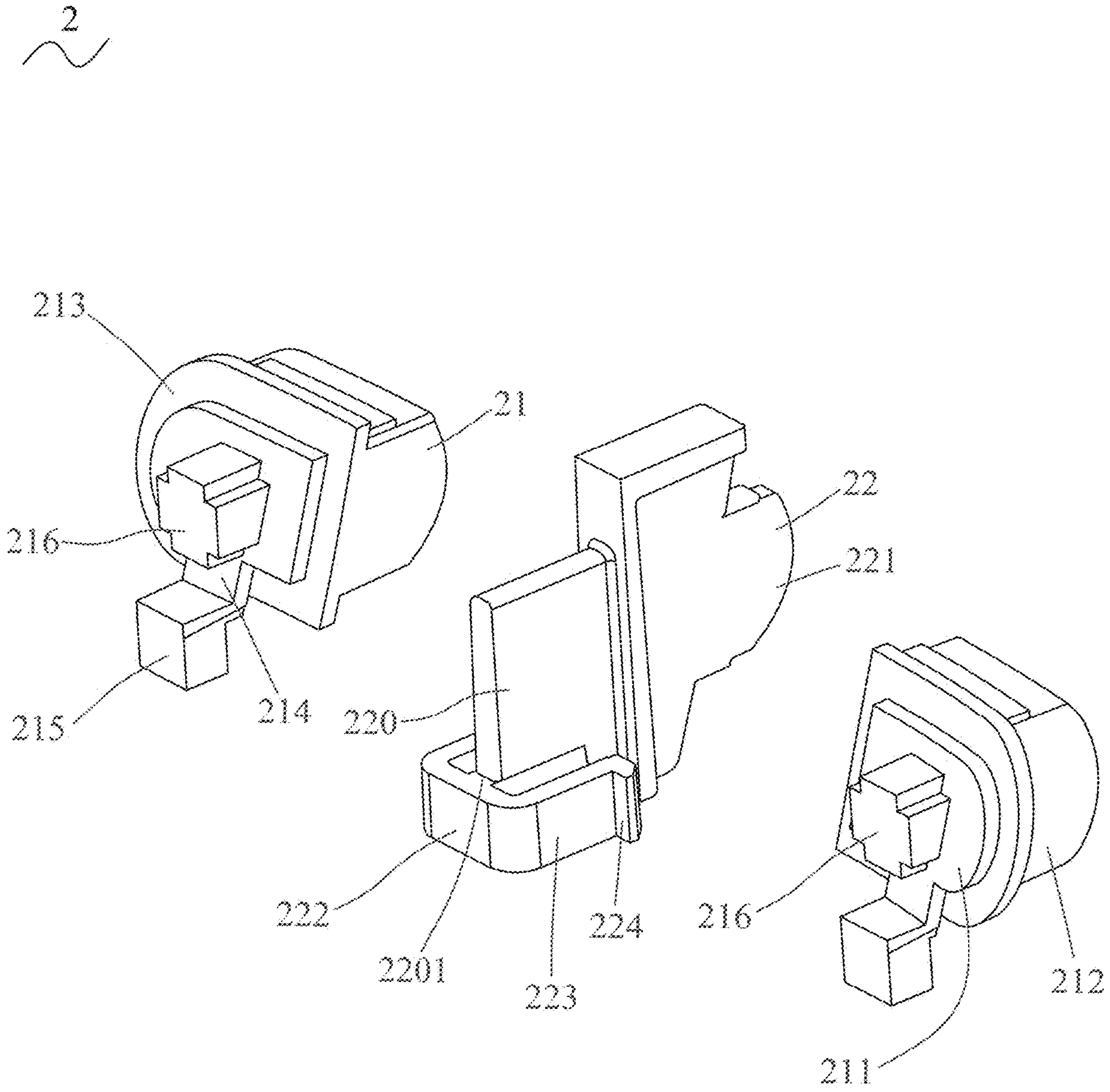
FIG. 9 is an exploded view of the button module of the headphone of FIG. 8.
Figure 10:
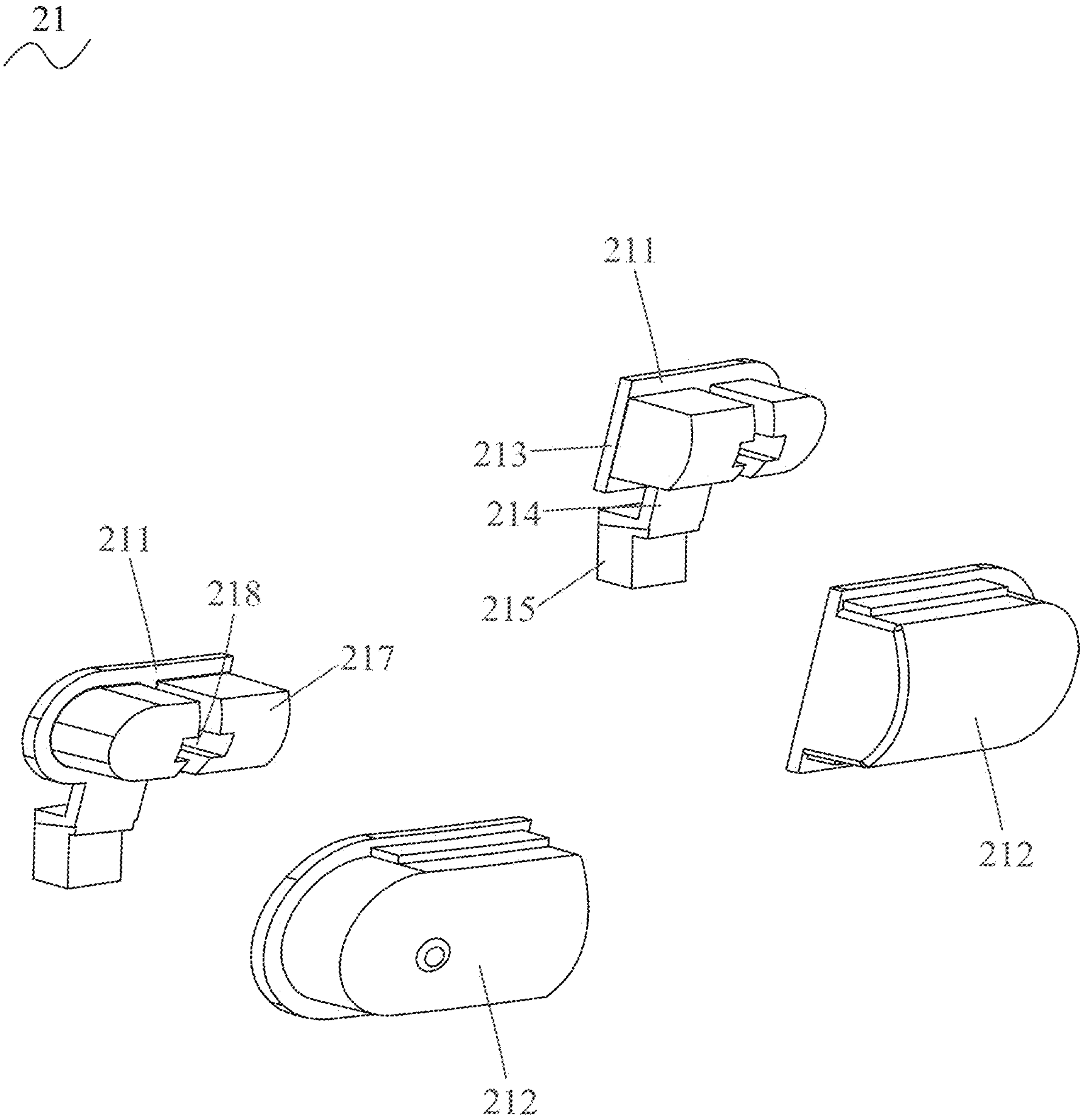
FIG. 10 is an exploded view of a push button of the button module of the headphone of FIG. 8.
Figure 11:
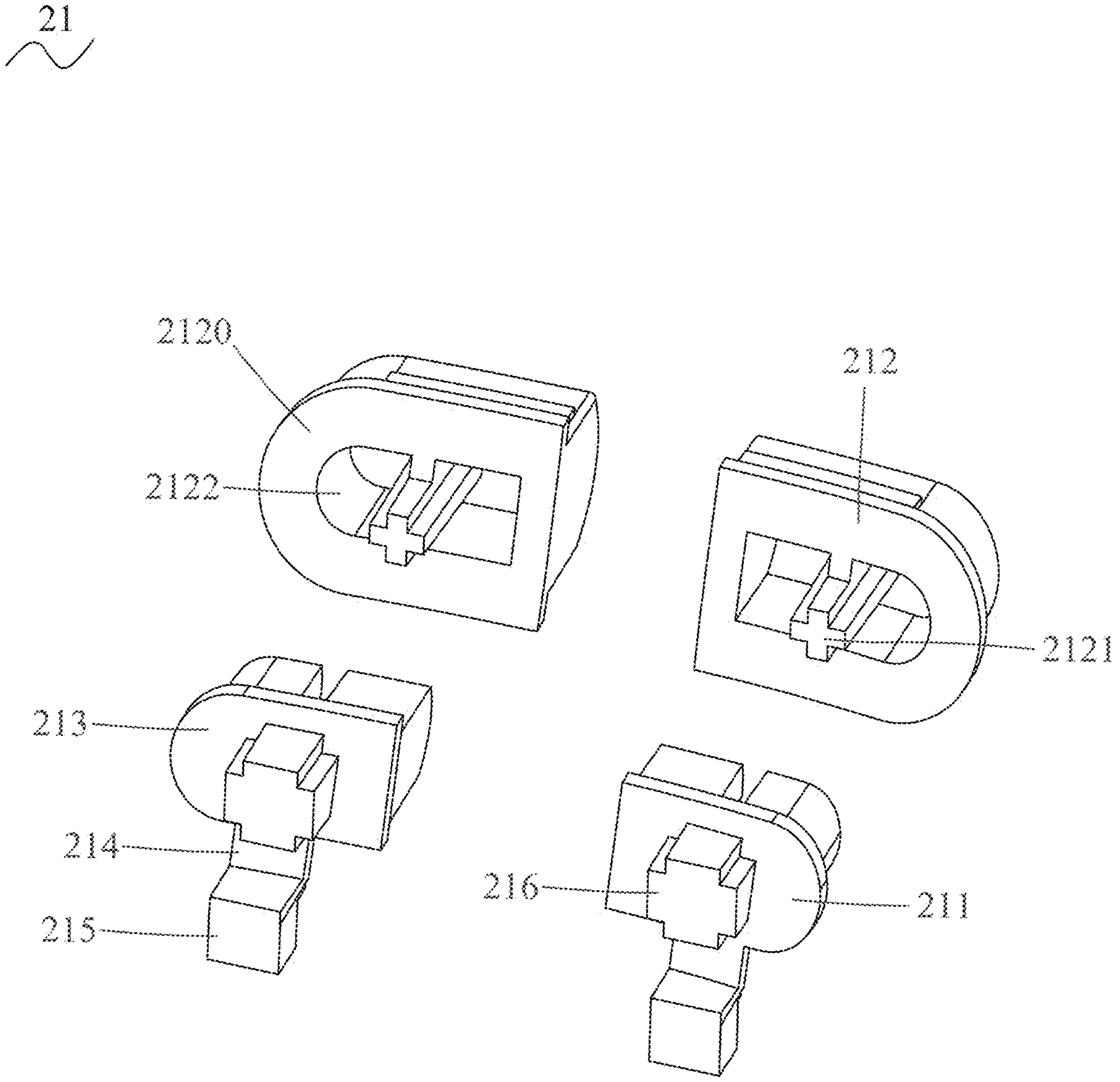
FIG. 11 is another exploded view of the push button of the button module of the headphone of FIG. 8.
Figure 12:
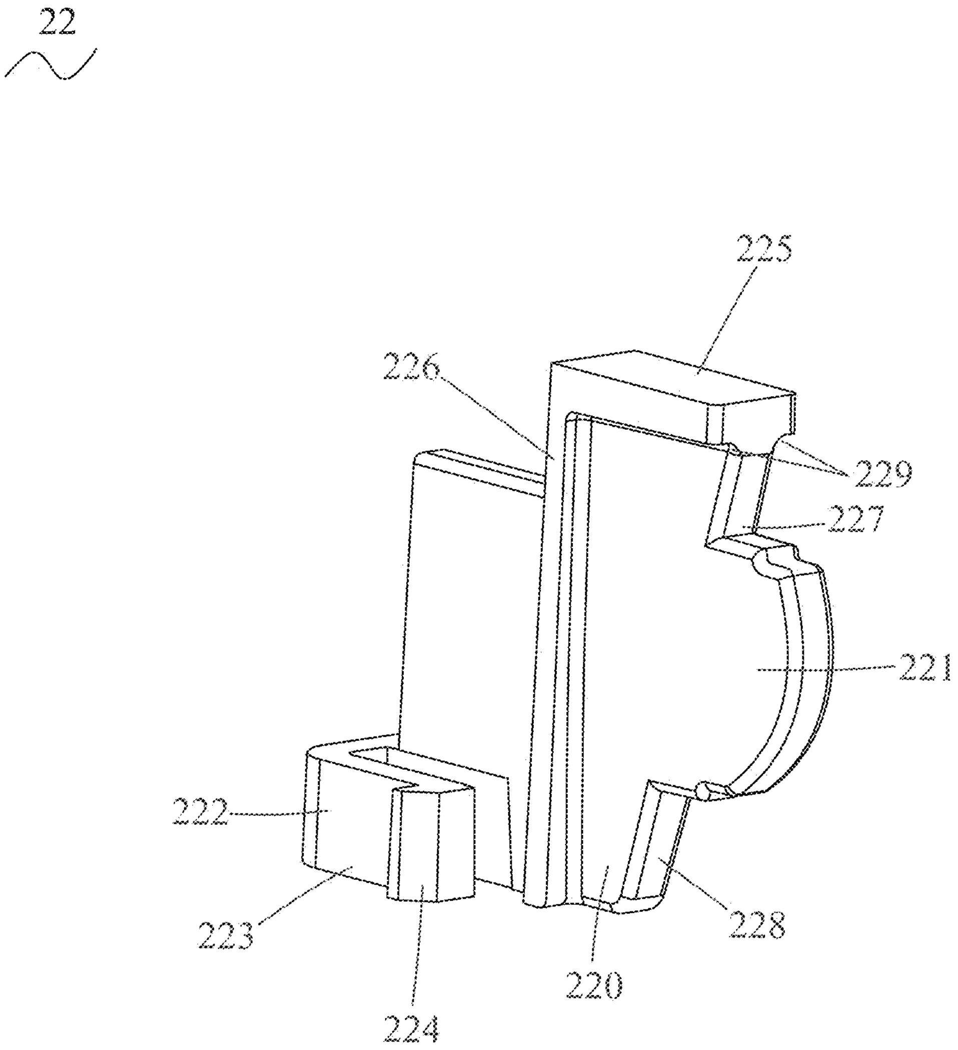
FIG. 12 is a perspective view of a light guiding unit of the button module of the headphone of FIG. 8.
Figure 13:
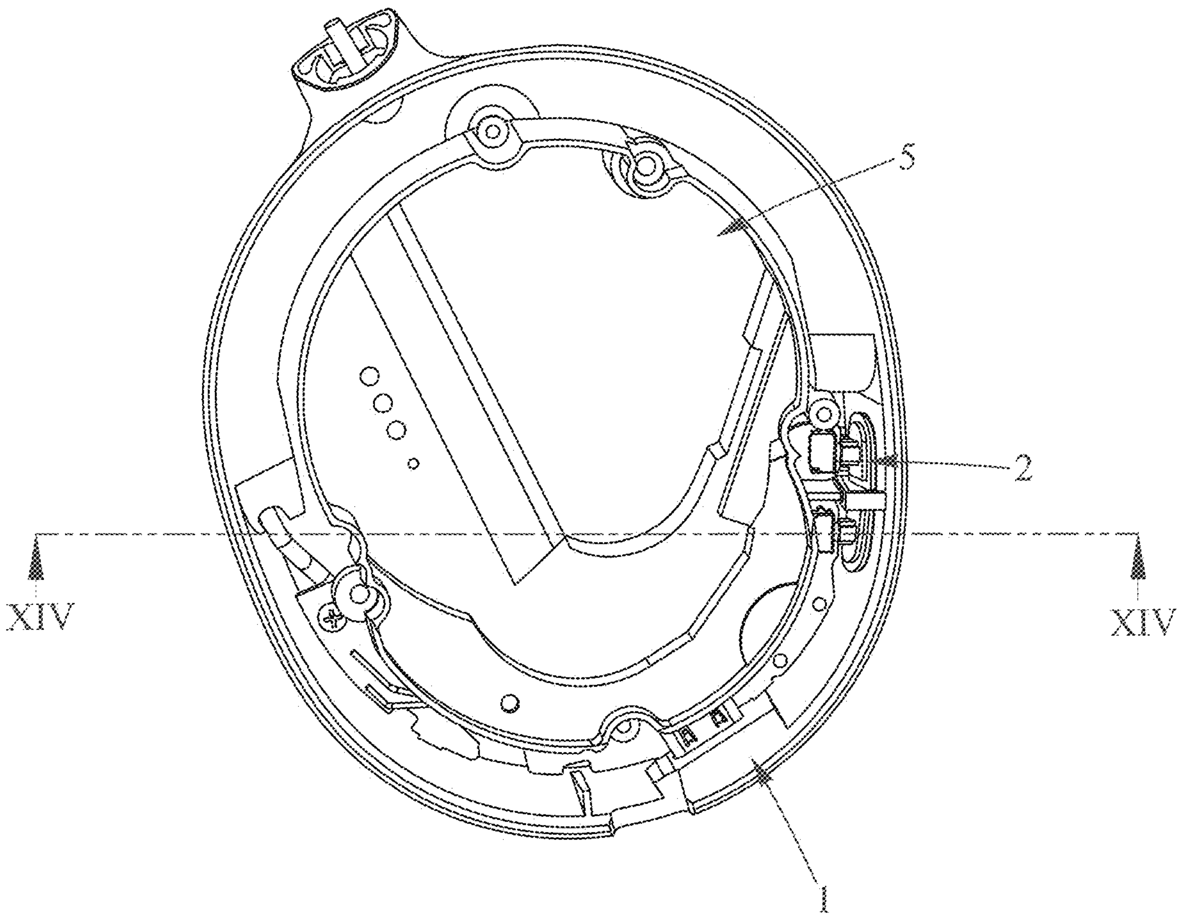
FIG. 13 is a partially schematic diagram of the headphone in accordance with the present invention.
Figure 14:
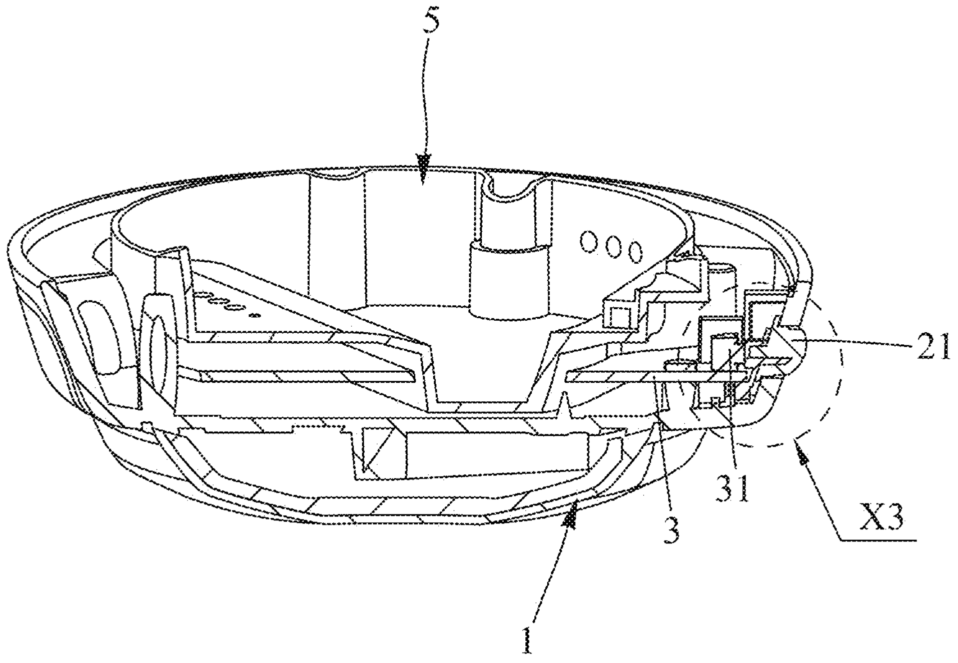
FIG. 14 is a cross-sectional view of the headphone along a line XIV-XIV of FIG. 13.
Figure 15:
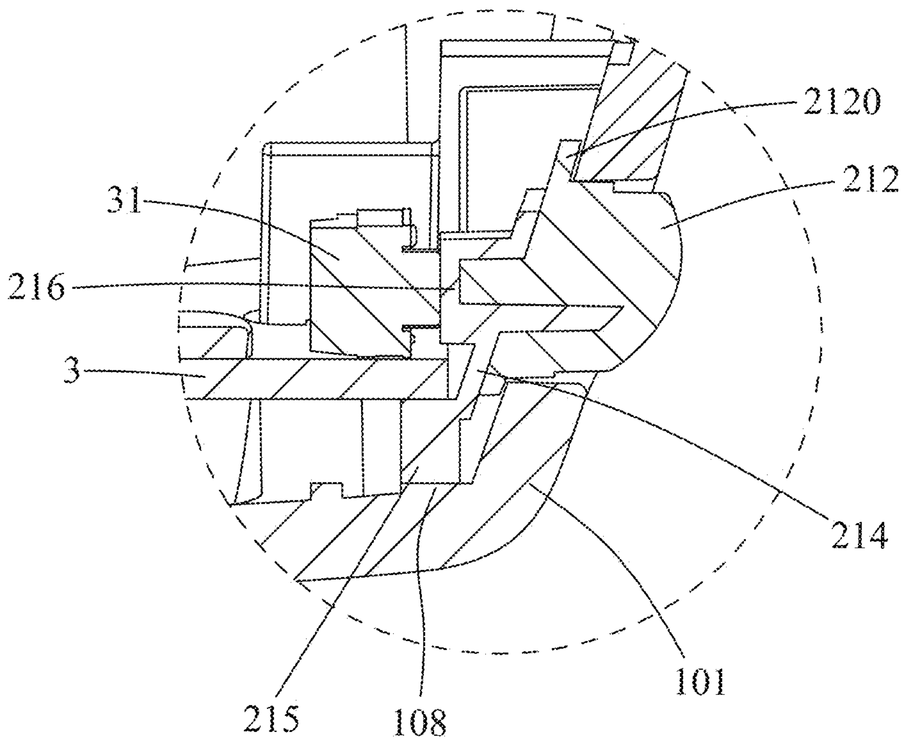
FIG. 15 is an enlarged view of an encircled portion X3 of the headphone of FIG. 14.
Figure 16:
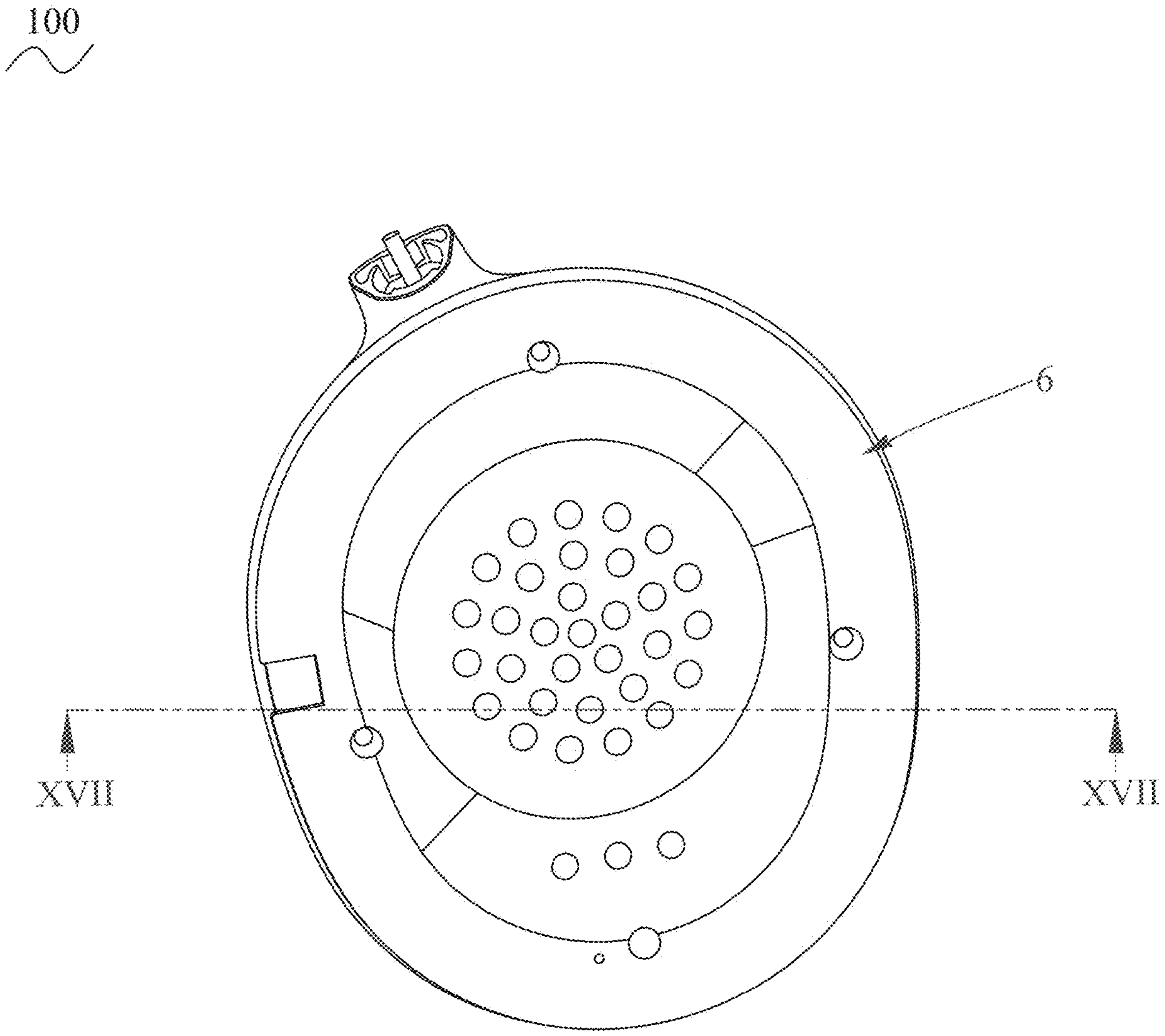
FIG. 16 is another schematic diagram of the earphone unit of the headphone in accordance with the present invention.
Figure 17:
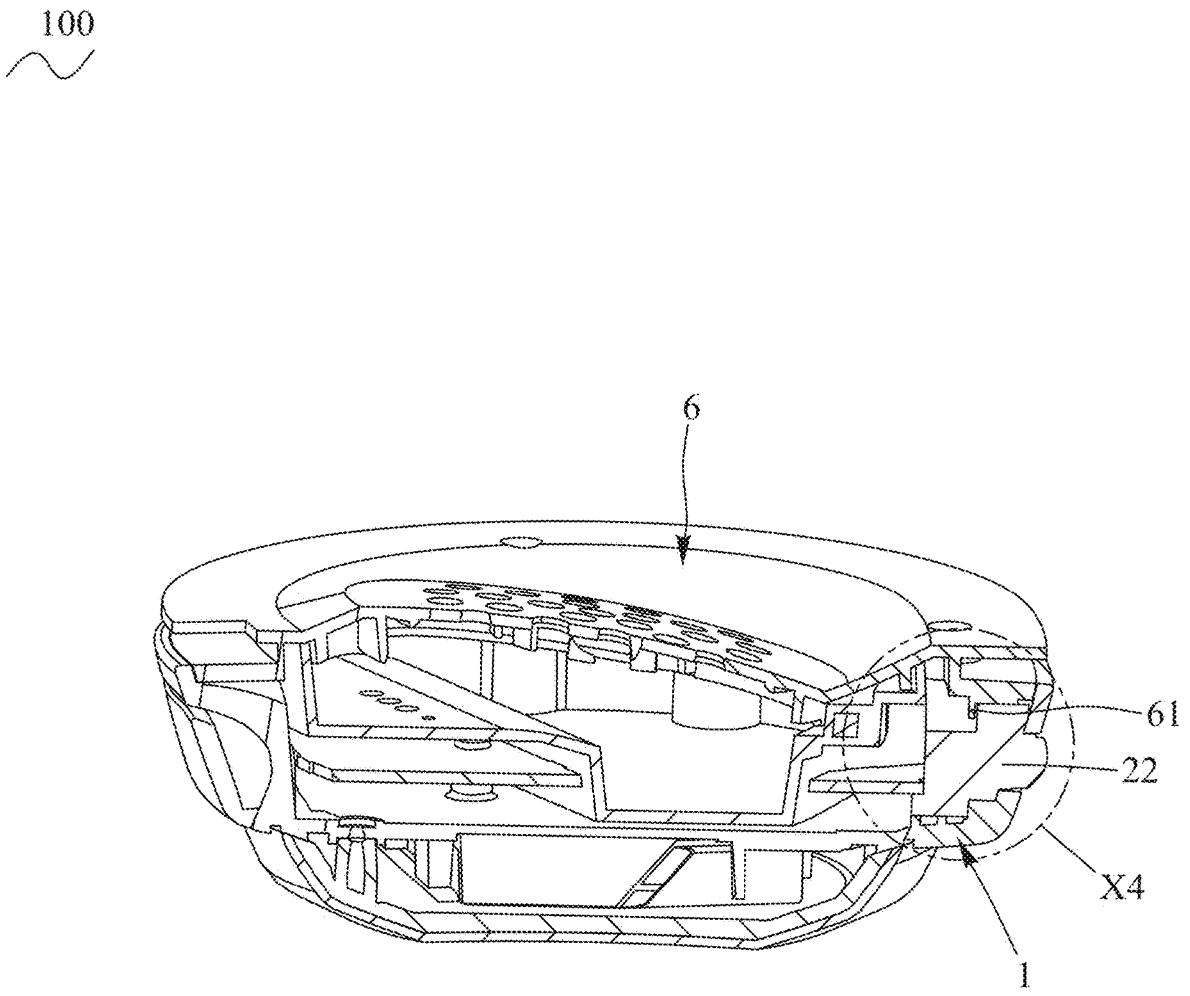
FIG. 17 is a cross-sectional view of the headphone along a line XVII-XVII of FIG. 16.
Figure 18:
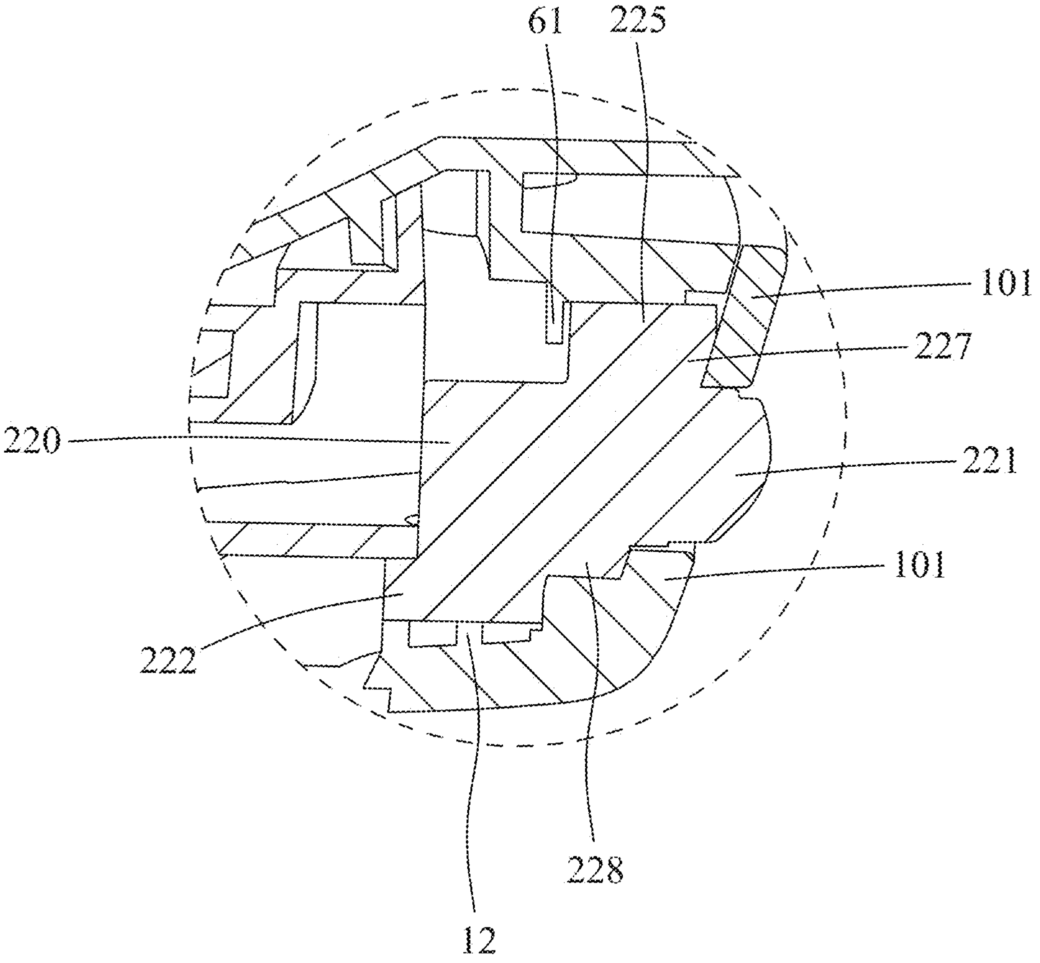
FIG. 18 is an enlarged view of an encircled portion X4 of the headphone of FIG. 17.

Referring to FIG. 5 and FIG. 6, the first notch 15 has a first recess 151, a second recess 152 and two stopping portions 153. An inner side of the first notch 15 is defined as the first recess 151 which is recessed opposite to the circuit board 3 in the inner periphery surface 104. The second recess 152 is connected between a middle of the first recess 151 and the middle of the inner side of the button hole 11. A width of the first recess 151 is wider than a width of the second recess 152. The first recess 151 is communicated with the second recess 152. An upper wall and a lower wall of the second recess 152 are defined as the two stopping portions 153. Two inner surfaces of the two stopping portions 153 are located at two junction areas between the first recess 151 and the second recess 152. The section of the outer corresponding structure of the button module 2 which is disposed away from the interior surface 103 is positioned corresponding to the two stopping portions 153. The second recess 152 is communicated with the button hole 11.

Referring to FIG. 5 to FIG. 10, the button module 2 includes two push buttons 21, and a light guiding unit 22 positioned between the two push buttons 21. Each push button 21 includes a button body 211 and a button cap 212. The button cap 212 is mounted to an outer end of the button body 211. The button cap 212 is combined with the button body 211 by an injection molding technology. The button module 2 is mounted in the outer housing 1. The button cap 212 penetrates through the button hole 11 of the outer housing 1. The button cap 212 is fixed to the button hole 11 of the outer housing 1. The two button caps 212 of the two push buttons 21 are located to the button hole 11 of the outer housing 1 of the housing 107 by the light guiding unit 22. The two button caps 212 of the two push buttons 21 are located to an upper surface and a lower surface of the light guiding unit 22. The light guiding unit 22 is located between the two push buttons 21. The button body 211 is placed between the peripheral wall 101 of the outer housing 1 and the circuit board 3. In the present invention, the two push buttons 21 are a power key and a Bluetooth key. In the concrete implementation, the two push buttons 21 are without being limited to be the power key and the Bluetooth key. In the present invention, the two push buttons 21 are made of thermoplastic polyurethane (TPU). In the concrete implementation, the two push buttons 21 are without being limited to be made of thermoplastic polyurethane (TPU). The two push buttons 21 are mounted in the housing 107. The two push buttons 21 penetrate through the button hole 11. The button body 211 is mounted in the outer housing 1 of the housing 107. The button cap 212 is mounted to the outer end of the button body 211. The button cap 212 penetrates through the button hole 11 of the outer housing 1 of the housing 107.

The button body 211 has a base board 213, an elastic portion 214, a retaining portion 215, a pressing portion 216, an inserting end 217 and a positioning groove 218. A middle of a lower side of the base board 213 slantwise extends towards the circuit board 3 and the inner surface of the housing 107 to form the elastic portion 214. The middle of the lower side of the base board 213 slantwise extends towards the circuit board 3 and the interior surface 103 to form the elastic portion 214. The elastic portion 214 is positioned to one end of the circuit board 3. The retaining portion 215 is extended inward and then is extended towards the inner surface of the housing 107 from an inner end of the button body 211. An outer side of the elastic portion 214 extends inward and protrudes towards the inner surface of the housing 107 to form the retaining portion 215. The outer side of the clastic portion 214 extends inward and protrudes towards the interior surface 103 to form the retaining portion 215. The elastic portion 214 is connected between the base board 213 and the retaining portion 215. An inner surface of the retaining portion 215 abuts against the circuit board 3. An outer surface of the retaining portion 215 abuts against the protruding platform 108. A free side of the elastic portion 214 which is adjacent to the interior surface 103 extends inward and then extends towards the interior surface 103 to form the retaining portion 215. The retaining portion 215 is placed between the circuit board 3 and the protruding platform 108. The retaining portion 215 is clamped between the circuit board 3 and the protruding platform 108. Two opposite surfaces of the retaining portion 215 abut against the circuit board 3 and the protruding platform 108, respectively. The retaining portion 215 is fastened between the circuit board 3 and the protruding platform 108.

When the push button 21 is pressed inward, the retaining portion 215 ensures that the push button 21 moves stably. The pressing portion 216 is extended inward from an inner surface of the button body 211. The retaining portion 215 is extended inward and then is extended towards the interior surface 103 from the inner end of the button body 211. The pressing portion 216 is spaced from the retaining portion 215. The pressing portion 216 is extended inward from an inner surface of the base board 213 of the button body 211. The pressing portion 216 contacts with a corresponding component of the circuit board 3. An outer surface of the base board 213 protrudes outward and opposite to the pressing portion 216 to form the inserting end 217. The inserting end 217 is inserted into a corresponding groove of the push button 21 to realize that the button body 211 is located to the button cap 212 and that the button body 211 is fastened to the button cap 212. The inserting end 217 is combined with the button cap 212. A middle of the inserting end 217 is recessed inward to form the positioning groove 218. The positioning groove 218 is cross-shaped. A corresponding construction of the push button 21 is inserted into the positioning groove 218 to realize that the button cap 212 is located to the button body 211 and that the button cap 212 is fixed to the button body 211.

The button cap 212 has a base portion 2120, a positioning block 2121 and a locating groove 2122. A middle of an inner surface of the base portion 2120 is recessed opposite to the push button 21 to form the locating groove 2122. A middle of an inner end of the base portion 2120 protrudes inward to form the positioning block 2121. The positioning block 2121 is cross-shaped. The positioning block 2121 is matched with the positioning groove 218. The positioning block 2121 is formed in the locating groove 2122. The positioning block 2121 projects out of the locating groove 2122. The inserting end 217 is inserted into the locating groove 2122, and the positioning block 2121 is inserted into the positioning groove 218 to realize that the button cap 212 is located to the button body 211 and that the button cap 212 is fixed to the button body 211. The inner surface of the base portion 2120 is connected with the base board 213 of the button body 211. A periphery of an outer end of the base portion 2120 abuts against the inner periphery surface 104 of the outer housing 1. A middle of the outer end of the base portion 2120 projects beyond the periphery of the outer end of the base portion 2120. The base portion 2120 is disposed in the button hole 11. The middle of the outer end of the base portion 2120 passes through the button hole 11, and the middle of the base portion 2120 is partially exposed to the outer periphery surface 106 of the outer housing 1 through the button hole 11. The corresponding groove of the push button 21 is the locating groove 2122. The corresponding construction of the push button 21 is the positioning block 2121.

The light guiding unit 22 is mounted in the outer housing 1 of the housing 107, and the light guiding unit 22 partially penetrates through the button hole 11. The light guiding unit 22 has a guiding board 220, a guiding body 221, a supporting base 222, two fixing arms 223, two hooks 224, a first reinforcing portion 225, two second reinforcing portions 226, a first ramp 227, a second ramp 228 and two curving portions 229. The guiding body 221 passes through a middle of the button hole 11, and the guiding body 221 is partially exposed to the outer periphery surface 106 of the outer housing 1. An outer portion of the guiding body 221 protrudes towards the inner surface of the housing 107 to form the guiding board 220. The outer portion of the guiding body 221 protrudes towards the interior surface 103 to form the guiding board 220. The guiding board 220 is positioned between the two first retaining walls 13. The inner corresponding structure of the button module 2 is the guiding board 220.

An upper portion and a lower portion of an inner end of the guiding board 220 oppositely extend perpendicular to the guiding board 220 to form the supporting base 222. The guiding board 220 and the supporting base 222 are connected by a connecting portion 2201. The connecting portion 2201 is extended from the inner end of the guiding board 220 to the supporting base 222. The supporting base 222 is clamped by the two first retaining walls 13. An upper portion of the supporting base 222 and a lower portion of the supporting base 222 extend outward to form the two fixing arms 223. The two fixing arms 223 abut against two facing surfaces of the two first retaining walls 13. Two outer ends of the two fixing arms 223 oppositely protrude perpendicular to the two fixing arms 223 to form the two hooks 224. The two hooks 224 hook two outer end surfaces of the two first retaining walls 13 to prevent the light guiding unit 22 from breaking away from an assembling direction.

An inner portion of the guiding board 220 protrudes opposite to the guiding board 220 to form the first reinforcing portion 225. The first reinforcing portion 225 is placed in a corresponding area of the inner housing 6 for fastening the light guiding unit 22. A junction between an upper portion of the first reinforcing portion 225 and the guiding board 220 is curved inward to form one curving portion 229. A junction between a lower portion of the first reinforcing portion 225 and the guiding board 220 is curved inward to form the other curving portion 229. The two curving portions 229 contact with the two stopping portions 153 of the first notch 15 of the outer housing 1. One second reinforcing portion 226 is perpendicularly extended from an upper surface of the guiding board 220 and an upper surface of the guiding body 221. The other second reinforcing portion 226 is perpendicularly extended from a lower surface of the guiding board 220 and a lower surface of the guiding body 221. The two second reinforcing portions 226 are connected to an inner end of the first reinforcing portion 225. The two second reinforcing portions 226 are disposed between the two second retaining walls 14, and the two second reinforcing portions 226 contact with two facing surfaces of the two second retaining walls 14 to fasten the light guiding unit 22. The light guiding unit 22 is disposed between the two first retaining walls 13 and the two second retaining walls 14 to locate the light guiding unit 22. The first reinforcing portion 225 and the two second reinforcing portions 226 are used for reinforcing a locating performance of the light guiding unit 22. The middle corresponding structure of the button module 2 includes the two second reinforcing portions 226.

One side of an outer surface of the guiding body 221 slantwise extends outward and towards the inner housing 6 to form the first ramp 227. The other side of the outer surface of the guiding body 221 is arched outward to form a convex shape. An outer surface of the guiding board 220 which is away from the first ramp 227 slantwise extends inward and towards the interior surface 103 to form the second ramp 228. The first ramp 227 of the light guiding unit 22 is fastened in the first notch 15 of the outer housing 1 to realize that the light guiding unit 22 is located to the outer housing 1 and that the light guiding unit 22 is fixed in the outer housing 1. The second ramp 228 of the light guiding unit 22 is fastened in the second notch 16 of the outer housing 1 to realize that the light guiding unit 22 is located to the outer housing 1 and that the light guiding unit 22 is fixed in the outer housing 1. The first notch 15 and the second notch 16 are configured to position the light guiding unit 22. The guiding body 221 of the light guiding unit 22 is positioned between the two push buttons 21.

The circuit board 3 is equipped with two switches 31 and an opening slot 32. The two switches 31 are mounted at one end of an inner surface of the circuit board 3 which is adjacent to the button hole 11. A quantity of the switches 31 equals to a quantity of push buttons 21. The two switches 31 are positioned corresponding to the pressing portions 216 of the two push buttons 21. An edge of the circuit board 3 is recessed inward to form the opening slot 32. The opening slot 32 is formed between the two switches 31. The two push buttons 21 are disposed corresponding to the two switches 31. The opening slot 32 is formed between the two push buttons 21. The guiding board 220 of the light guiding unit 22 is disposed in the opening slot 32. The edge of the circuit board 3 is arranged corresponding to the two elastic portions 214 of the two push buttons 21. The edge of the circuit board 3 is positioned between the pressing portions 216 and the retaining portions 215 of the two push buttons 21. The corresponding component of the circuit board 3 is the switch 31.

A surface of the inner housing 6 which is towards the outer housing 1 protrudes towards the outer housing 1 to form a U-shaped limiting portion 61. A mouth of the limiting portion 61 faces outward. The first reinforcing portion 225 of the light guiding unit 22 of the button module 2 is assembled in the limiting portion 61 for locating the light guiding unit 22. The corresponding area of the inner housing 6 is the limiting portion 61.

Referring to FIG. 1 to FIG. 18, when the headphone 100 is assembled, specific assembling steps of the headphone 100 are described as follows: Assemble the light guiding unit 22 in the outer portion of the accommodating space 10, the guiding body 221 partially penetrates through the middle of the button hole 11, and the other side of the outer surface of the guiding body 221 is exposed outside of the button hole 11. The first ramp 227 and the second ramp 228 are buckled in the first notch 15 and the second notch 16, respectively. The first reinforcing portion 225 is restricted into the first recess 151. The first ramp 227 is buckled in the second recess 152. The two stopping portions 153 are blocked in the two curving portions 229. The two second reinforcing portions 226 are located between the two second retaining walls 14. The supporting base 222 resists against the two reinforcing ribs 12, and the supporting base 222 is located between the two first retaining walls 13, and the two hooks 224 hook the two outer surfaces of the two first retaining walls 13. The section of the outer corresponding structure of the button module 2 is the first ramp 227. The other section of the outer corresponding structure of the button module 2 is the second ramp 228.

Next, assemble the two push buttons 21 in the outer portion of the accommodating space 10 of the outer housing 1, and the two button caps 212 pass through an upper portion and a lower portion of the button hole 11, respectively. The light guiding unit 22 is assembled in the button hole 11, so when the two button caps 212 pass through the button hole 11, the two button caps 212 are guided by the light guiding unit 22, and the two button caps 212 are oriented by the light guiding unit 22, and the two retaining portions 215 of the two push buttons 21 abut against an upper portion and a lower portion of the protruding platform 108. Two facing surfaces of the two base boards 213 of the two push buttons 21 abut against an upper surface and a lower surface of the guiding body 221. Two outer surfaces of the two base boards 213 of the two push buttons 21 abut against the inner periphery surface 104 of the outer housing 1.

Later, assemble the circuit board 3 in the outer portion of the accommodating space 10 of the outer housing 1, insert the guiding body 221 of the light guiding unit 22 into the opening slot 32, and make the circuit board 3 abut against the supporting base 222 of the light guiding unit 22, the two first retaining walls 13, the two second retaining walls 14, the two retaining portions 215 of the two push buttons 21 and an inner end of the connecting portion 2201. The two switches 31 of the circuit board 3 resist against the two pressing portions 216 of the two push buttons 21 to fasten the two push buttons 21 and the light guiding unit 22 to the circuit board 3. Then, assemble the cavity holder 5 into the outer portion of the accommodating space 10 of the outer housing 1, the cavity holder 5 is located at an inner side of the circuit board 3. At last, assemble the inner housing 6 with the outer housing 1, so that the inner housing 6 and the outer housing 1 surround the accommodating space 10, and the accommodating space 10 is sealed between the inner housing 6 and the outer housing 1, the limiting portion 61 is mounted around the first reinforcing portion 225 to guide the inner housing 6 and position the inner housing 6 and the light guiding unit 22.

As described above, the headphone 100 guides the two push buttons 21 to the button hole 11 by the light guiding unit 22, and the headphone 100 positions the two push buttons 21 to the button hole 11 by the light guiding unit 22. Furthermore, the two retaining portions 215 of the two push buttons 21 are clamped between the protruding platform 108 and the circuit board 3, so that the two push buttons 21 move stably under repeatedly pressing the two push buttons 21, so an abrasion of the circuit board 3 caused by the two push buttons 21 is reduced. As a result, the headphone 100 increases a using lifespan.

What is claimed is:

1. A headphone, comprising:

an outer housing, having:

a peripheral wall, an inner surface of the peripheral wall being defined as an inner periphery surface, an outer surface of the peripheral wall being defined as an outer periphery surface;

a button hole penetrating through the inner periphery surface and the outer periphery surface; and an outer wall connected with an outer periphery of the peripheral wall, an inner surface of the outer wall being defined as an interior surface, an outer surface of the outer wall being defined as an external surface, the inner periphery surface being connected with a periphery of the interior surface, the interior surface protruding inward to form a protruding platform, the protruding platform being positioned between the interior surface and the inner periphery surface;

a light guiding unit mounted in the outer housing, and the light guiding unit partially penetrating through the button hole;

two push buttons, each push button having:

a button body mounted in the outer housing;

a button cap mounted to an outer end of the button body, the button cap penetrating through the button hole of the outer housing, two button caps of the two push buttons being located to the button hole of the outer housing by the light guiding unit, the two button caps of the two push buttons being located to an upper surface and a lower surface of the light guiding unit;

a pressing portion extended inward from an inner surface of the button body; and a retaining portion extended inward and then extended towards the interior surface from an inner end of the button body, the pressing portion being spaced from the retaining portion, an outer surface of the retaining portion abutting against the protruding platform;

a circuit board mounted in the outer housing, an inner surface of the retaining portion abutting against the circuit board, the retaining portion being clamped between the circuit board and the protruding platform;

two switches mounted at the circuit board, the two switches resisting against the two pressing portions of the two push buttons; and an inner housing covered to the peripheral wall of the outer housing.

2. The headphone as claimed in claim 1, wherein the button body has a base board, an outer surface of the base board protrudes outward and opposite to the pressing portion to form an inserting end, the inserting end is combined with the button cap, a middle of a lower side of the base board slantwise extends towards the circuit board and the interior surface to form an elastic portion, an outer side of the elastic portion extends inward and protrudes towards the interior surface to form the retaining portion, the elastic portion is connected between the base board and the retaining portion, the pressing portion is extended inward from an inner surface of the base board.

3. The headphone as claimed in claim 2, wherein the button cap has a base portion, an inner surface of the base portion is connected with the base board of the button body, a periphery of an outer end of the base portion abuts against the inner periphery surface of the outer housing, a middle of the outer end of the base portion projects beyond the periphery of the outer end of the base portion, the base portion is disposed in the button hole, the middle of the outer end of the base portion passes through the button hole, and the middle of the base portion is partially exposed to the outer periphery surface of the outer housing through the button hole.

4. The headphone as claimed in claim 3, wherein a middle of an inner surface of the base portion is recessed opposite to the push button to form a locating groove, a middle of an inner end of the base portion protrudes inward to form a positioning block, the positioning block is formed in the locating groove, the positioning block projects out of the locating groove, a middle of the inserting end is recessed inward to form a positioning groove, the inserting end is inserted into the locating groove, and the positioning block is inserted into the positioning groove.

5. The headphone as claimed in claim 4, wherein the positioning groove is cross-shaped, the positioning block is cross-shaped, the positioning block is matched with the positioning groove.

6. The headphone as claimed in claim 2, wherein an edge of the circuit board is arranged corresponding to two elastic portions of the two push buttons, the edge of the circuit board is positioned between the pressing portions and the retaining portions of the two push buttons.

7. The headphone as claimed in claim 1, wherein the inner periphery surface is recessed opposite to the circuit board to form a first notch, the light guiding unit has a guiding body, one side of an outer surface of the guiding body slantwise extends outward and towards the inner housing to form a first ramp, the first ramp is fastened in the first notch.

8. The headphone as claimed in claim 7, wherein the inner periphery surface of the outer housing is recessed opposite to the circuit board to form a second notch, an outer portion of the guiding body protrudes towards the interior surface to form a guiding board, an outer surface of the guiding board which is away from the first ramp slantwise extends inward and towards the interior surface to form a second ramp, the second ramp is fastened in the second notch.

9. A headphone, comprising:

a housing having a button hole penetrating through a sidewall of the housing, an inner surface of the housing protruding inward to form a protruding platform;

a light guiding unit mounted in the housing, and the light guiding unit partially penetrating through the button hole, the light guiding unit having a guiding board;

two push buttons mounted in the housing, the two push buttons penetrating through the button hole, the two push buttons being located to the button hole by the light guiding unit, the light guiding unit being located between the two push buttons, each push button having a button body, and a retaining portion extended inward and then extended towards the inner surface of the housing from an inner end of the button body; and a circuit board mounted in the housing, the retaining portion being clamped between the circuit board and the protruding platform, the circuit board being equipped with two switches, the two switches resisting against the two push buttons, an edge of the circuit board being recessed inward to form an opening slot, the opening slot being formed between the two switches, the guiding board of the light guiding unit being disposed in the opening slot.

10. The headphone as claimed in claim 9, wherein the button body is mounted in the housing, the button body has a base board, and a pressing portion extended inward from an inner surface of the button body, the two switches resist against the two pressing portions of the two push buttons, a middle of a lower side of the base board slantwise extends towards the circuit board and the inner surface of the housing to form an elastic portion, an outer side of the elastic portion extends inward and protrudes towards the inner surface of the housing to form the retaining portion, two opposite surfaces of the retaining portion abut against the circuit board and the protruding platform, respectively.

11. A headphone, comprising:

an outer housing;

an inner housing, the outer housing and the inner housing being assembled to form a housing, an inside of the housing defining an accommodating space, the accommodating space being formed between the outer housing and the inner housing, the housing having a button hole penetrating through a sidewall of the housing, an inner surface of the housing protruding inward to form a protruding platform;

a button module accommodated in the accommodating space, the button module having:

a light guiding unit having a guiding body, an outer portion of the guiding body protruding towards the inner surface of the housing to form a guiding board, the guiding body passing through a middle of the button hole, and the guiding body being partially exposed to an outer periphery surface of the outer housing; and two push buttons penetrating through the button hole, the light guiding unit being located between the two push buttons, each push button having a button body, the button body having a base board, and a retaining portion extended inward and then extended towards the inner surface of the housing from an inner end of the button body, two facing surfaces of the two base boards of the two push buttons abutting against an upper surface and a lower surface of the guiding body; and a circuit board accommodated in the accommodating space, the retaining portion being clamped between the circuit board and the protruding platform, the circuit board being equipped with two switches, the two switches resisting against the two push buttons, an edge of the circuit board being recessed inward to form an opening slot, the opening slot being formed between the two switches, the guiding board of the light guiding unit being disposed in the opening slot.

12. The headphone as claimed in claim 11, wherein the outer housing has an outer wall, an inner surface of the outer wall is defined as an interior surface, the outer housing has two reinforcing ribs extended inward from one side of the interior surface, and two first retaining walls extended from the one side of the interior surface, the two reinforcing ribs extend along an up-down direction, the two first retaining walls penetrate through the two reinforcing ribs, the two first retaining walls are perpendicular to the two reinforcing ribs, an upper portion and a lower portion of an inner end of the guiding board oppositely extend perpendicular to the guiding board to form a supporting base, the supporting base is clamped by the two first retaining walls, two inner surfaces of the two first retaining walls abut against the circuit board.

13. The headphone as claimed in claim 12, wherein the outer housing has a peripheral wall and two second retaining walls, the outer wall is connected with an outer periphery of the peripheral wall, an inner surface of the peripheral wall is defined as an inner periphery surface, two portions of the inner periphery surface extend inward to form the two second retaining walls, the light guiding unit is disposed between the two first retaining walls and the two second retaining walls.

* * * * *